United States Patent
Templin et al.

(10) Patent No.: US 11,491,817 B2
(45) Date of Patent: Nov. 8, 2022

(54) SHIELDED VENT PLUG FOR WHEEL END HUBCAPS

(71) Applicant: Aktiebolaget SKF, Gothenburg (SE)

(72) Inventors: Dave B Templin, Elgin, IL (US); Kacy Denton, Belmont, NC (US)

(73) Assignee: AKTIEBOLAGET SKF, Gothenburg (SE)

( * ) Notice: Subject to any disclaimer, the term of this patent is extended or adjusted under 35 U.S.C. 154(b) by 1094 days.

(21) Appl. No.: 16/128,094

(22) Filed: Sep. 11, 2018

(65) Prior Publication Data
US 2020/0079144 A1 Mar. 12, 2020

(51) Int. Cl.
*B60B 7/00* (2006.01)
*F16N 19/00* (2006.01)

(52) U.S. Cl.
CPC ........ *B60B 7/002* (2013.01); *B60B 2900/561* (2013.01); *F16N 19/00* (2013.01)

(58) Field of Classification Search
CPC . B60B 7/002; B60B 7/0013; B60B 2900/561; F16N 19/00
See application file for complete search history.

(56) References Cited

U.S. PATENT DOCUMENTS

| | | | | |
|---|---|---|---|---|
| 3,316,022 A | * | 4/1967 | Isenbarger | B60B 27/0073 277/928 |
| 5,505,525 A | * | 4/1996 | Denton | B60B 27/02 301/108.4 |
| 5,860,708 A | * | 1/1999 | Borders | B60B 7/00 301/108.4 |
| 6,783,191 B1 | * | 8/2004 | Slesinski | B60B 7/14 301/108.4 |
| 6,938,963 B2 | * | 9/2005 | Denton | B60B 7/08 301/108.4 |
| D850,352 S | * | 6/2019 | Henry | D12/213 |
| 2005/0062340 A1 | * | 3/2005 | Denton | B60B 7/08 301/108.1 |
| 2014/0361605 A1 | * | 12/2014 | Feicha | B60B 7/14 301/108.1 |
| 2016/0059625 A1 | * | 3/2016 | Templin | B60B 27/0073 29/894.38 |

FOREIGN PATENT DOCUMENTS

CN 108150687 A * 6/2018

* cited by examiner

*Primary Examiner* — Kip T Kotter
(74) *Attorney, Agent, or Firm* — J-Tek Law PLLC; Scott T. Wakeman; Mark A. Ussai

(57) ABSTRACT

A plug for a hubcap includes a base configured to fit into and obstruct a port of a hubcap. The base at least partially defines a cavity therein. The plug also includes a cap extending radially outward from the base. The cap defines an opening therein, the opening extending at least partially radially, and a passage extending axially between the opening and the cavity. The opening is in fluid communication with the cavity via the passage.

18 Claims, 2 Drawing Sheets

Figure 1:
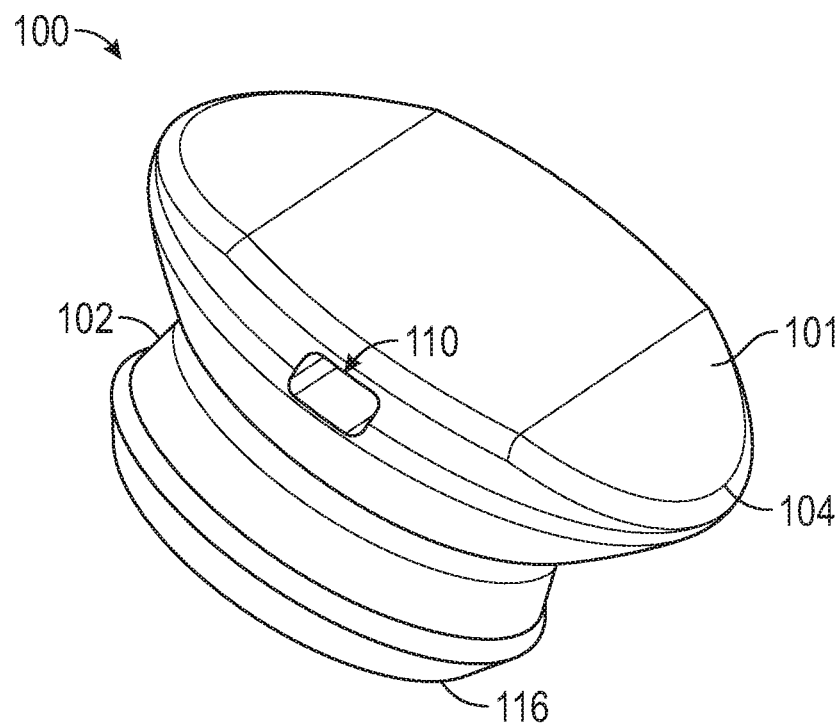

SHIELDED VENT PLUG FOR WHEEL END HUBCAPS

BACKGROUND

In tractor and trailer wheel end axle assemblies, the wheel is mounted on a fixed axle or spindle, and is rotatable about the axle or spindle. The hub of the wheel includes a lubricant chamber around the end of the spindle, in which the wheel bearings may be positioned. Lubricant is maintained in the lubricant chamber or wheel housing to provide lubricant to the bearings. Particularly in freight or other heavy-duty applications, a hubcap is used to enclose the lubricant chamber.

The hubcaps may be ventilated, because the operation of a truck or trailer results in the heating of the fluid lubricant within the wheel housing. Ventilation provides pressure equalization between the lubricant chamber and the surrounding atmosphere. Such ventilated hubcap designs have been implemented with varying levels of success. For example, the hubcaps may vent gas through a fill plug with a vent port on the outside thereof. While this may provide for acceptable ventilation, a drawback of such designs is that they can allow for ingress of contaminants, particularly water, during a high-pressure washdown of the wheels, into the lubrication chamber. Accordingly, plugs with a one-way valve are sometimes employed, in which the ventilation path is only open when pressure builds up from within the hubcap, or which integrate components such a labyrinth seals into the plug. However, such flow restriction devices can increase expenses and can limit the effectiveness of the ventilation.

SUMMARY

Embodiments of the disclosure may provide a plug for a hubcap, the plug including a base configured to fit into and obstruct a port of a hubcap. The base at least partially defines a cavity therein. The plug also includes a cap extending radially outward from the base. The cap defines an opening therein, the opening extending at least partially radially, and a passage extending axially between the opening and the cavity. The opening is in fluid communication with the cavity via the passage.

Embodiments of the disclosure may also provide a hubcap including a hubcap body defining a port, and a plug configured to be received into the port, so as to at least partially obstruct the port. The plug includes a base configured to fit into and couple with the port, wherein the base at least partially defines a cavity therein, and a cap extending radially outward from the base. The cap defines an opening therein, the opening extending at least partially radially, and a passage extending axially between the opening and the cavity. The opening is in fluid communication with the cavity via the passage.

Embodiments of the disclosure may further provide an apparatus for plugging a centerfill port in a hubcap. The apparatus includes a base configured to fit into and obstruct the port of the hubcap. The base at least partially defines a cavity therein. The apparatus also includes a cap that is integral with the base and extends radially outward therefrom. The cap defines an opening therein, the opening extending at least partially radially, and a passage extending axially between the opening and the cavity. The opening is in fluid communication with the cavity via the passage. The apparatus also includes an inner splash shield positioned in the cavity. The inner splash shield includes an opening that communicates with, but is not aligned with, the passage. The inner splash shield includes a bottom, a cylindrical side surface, and an open-ended toroidal retention portion. The open-ended toroidal retention portion bears against a surface of the base defining the cavity, so as to retain the inner splash shield in the cavity. The opening of the inner splash shield extends radially through the cylindrical side surface, and the passage is aligned with the bottom of the inner splash shield. The apparatus does not include any filters or valves.

The foregoing summary is intended merely to introduce some aspects of the following disclosure and is thus not intended to be exhaustive, identify key features, or in any way limit the disclosure or the appended claims.

BRIEF DESCRIPTION OF THE DRAWINGS

The accompanying drawings, which are incorporated in and constitute a part of this specification, illustrate an embodiment of the present teachings and together with the description, serve to explain the principles of the present teachings. In the figures:

FIG. 1 illustrates a raised perspective view of a plug for a hubcap center-fill port, according to an embodiment.

FIG. 2 illustrates a side, cross-sectional view of the plug, according to an embodiment.

FIG. 3 illustrates a side, cross-sectional view of the plug outside of a hubcap body, according to an embodiment.

FIG. 4 illustrates a side, cross-sectional view of the plug received into the center-fill port of the hubcap body, according to an embodiment.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawings. In the drawings, like reference numerals have been used throughout to designate identical elements, where convenient. In the following description, reference is made to the accompanying drawings that form a part of the description, and in which is shown by way of illustration one or more specific example embodiments in which the present teachings may be practiced.

FIG. 1 illustrates a perspective view of a center-fill plug 100 for a hubcap, according to an embodiment. FIG. 2 illustrates a side, cross-sectional view of the plug 100, according to an embodiment. Referring to both FIGS. 1 and 2, the plug 100 includes a plug body 101 having a base 102 and a cap 104. The cap 104 may extend radially outwards from the base 102, as shown, and may thus define a greater diameter than the base 102. Further, the cap 104 may define a transition surface 105, having an increasing outer diameter as proceeding away from the base 102. The plug body 101 (e.g., the base 102 and the cap 104) may be integrally formed from a single piece. For example, the base 102 and the cap 104 may be cast together of any suitable material, such as plastic, rubber, or any other elastomer, polymer, composite, or metal material.

The plug 100 may be vented. For example, the plug 100 may include a cavity 106, a passage 108, and a radial opening 110, which may intersect and communicate with one another, providing a flowpath through the plug 100. The cavity 106 may be defined at least partially by a cylindrical inner surface 112 of the base 102, and may be open-ended on one side, as shown. In a specific embodiment, the inner surface 112 may extend radially outwards as proceeding away from the cap 104 and toward an axial end 116 of the plug 100. The cavity 106 may also be defined within the cap 104, and, e.g., the cap 104 may provide a top surface 114 for the cavity 106.

Figure 3:
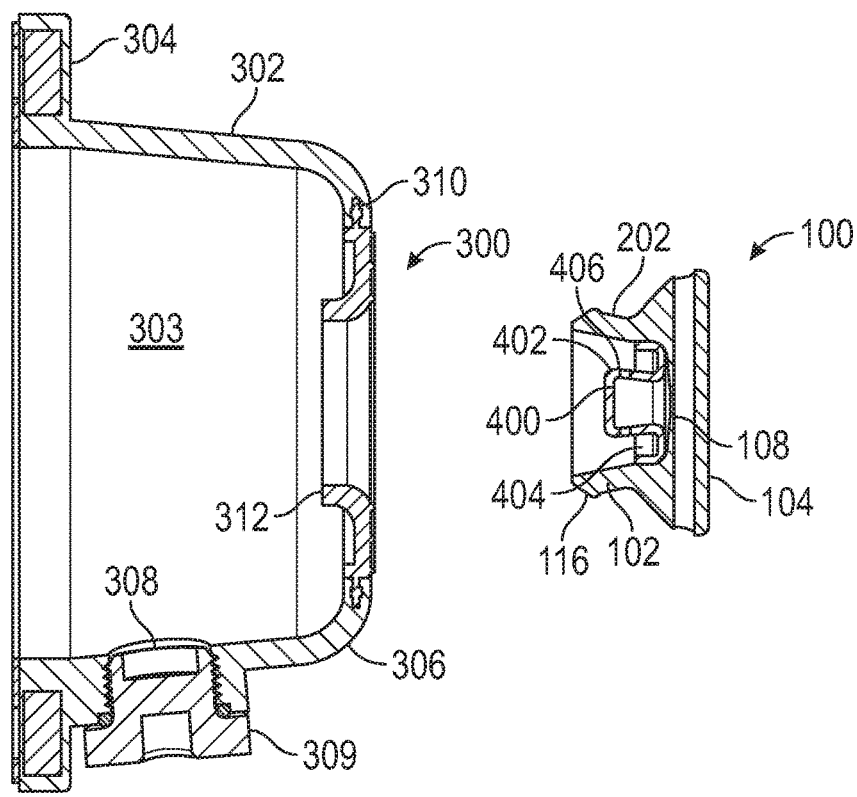
Figure 4:
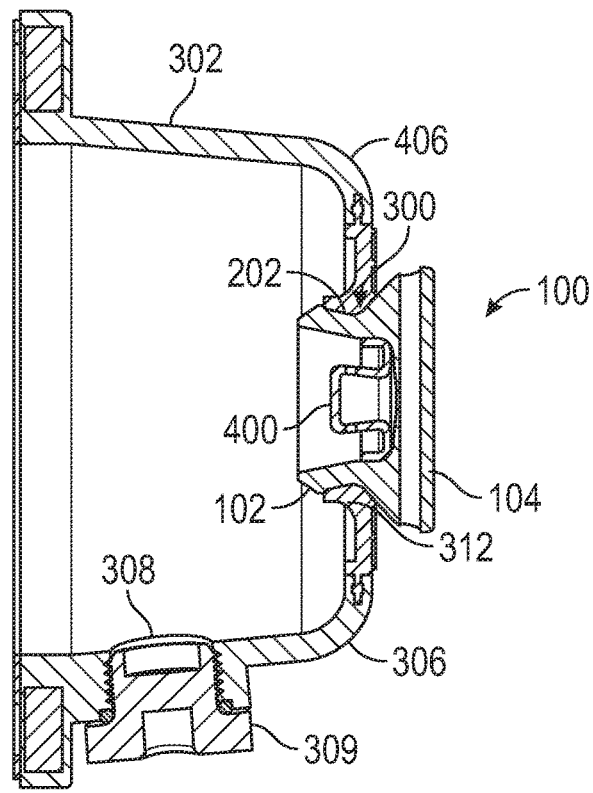

The passage 108 may be defined in the cap 104 and may extend axially, along a central longitudinal axis 120 of the plug 100. In particular, the passage 108 may extend through the top surface 118 to the radial opening 110, thereby communicating the cavity 106 with the radial opening 110. In turn, the radial opening 110 may extend radially (e.g., at least partially perpendicular to the axis 120) outwards from the center of the plug 100 and outwards through the side of the cap 104, the side having an outer radial dimension that is greater than any outer radial dimension of the base 102, as best shown in FIGS. 3 and 4. Although a single radial opening 110 is shown, it will be appreciated that two or more, distributed at any angular interval may be employed.

As such, venting through the plug 100 may be accomplished by communication through the cavity 106, the passage 108, and the radial opening 110. Further, there is no direct path between the exterior of the plug 100 and the cavity 106, as the flowpath turns from radial to axial between the radial opening 110 and the axial passage 108. As such, fluids, such as water sprayed onto a hub cap, may not reach the interior of the hub cap through the plug 100.

Accordingly, embodiments of the present plug 100 may allow for gaseous venting, but may prevent, or at least reduce, fluid flow therethrough. This may be accomplished without the use of expensive filters or flow restriction (e.g., labyrinth seals) or multiple component parts made of different materials, but rather may be, in some embodiments, cast as a single piece.

The plug 100 may be configured to couple to a hub cap via an interference fit, although this is but one configuration contemplated, and others, such as threading, could also be used. In such an interference fit, the base 102 may extend radially outwards as proceeding toward the axial end 116, and may be configured to deflect resiliently inwards, in order to push the plug 100 into a center-fill port of a hubcap. Further, the base 102 may define a retention lip 200, which may be proximal to the axial end 116 and may extend radially outwards from a remainder of the base 102, as shown. Between the retention lip 200 and the transition surface 105, the plug 100 (e.g., the base 102 thereof) may define a retention contour 202. The retention contour 202 may receive a rim or another surface of the hubcap. The lip 200 may press on one side of the hubcap, and the transition surface 105 may press on the other side, thereby keeping the plug 100 in place.

FIGS. 3 and 4 illustrate side, cross-sectional views of the plug 100 being received into a center-fill port 300 of a hubcap 302, according to an embodiment. As shown, the hubcap 302 may include a flange 304, which may be coupled to a wheel, e.g., of a truck. The hubcap 302 may also include a body 306, which may be generally cylindrical and hollow, as shown, extending from (e.g., integrally formed with) the flange 304. The hollow interior may define a chamber 303 containing lubricant to lubricate wheel bearings. A side port 308 may be defined through the body 306, and a threaded plug 309 may be coupled to the body 306, in the port 308. The center-fill port 300 may be positioned through the body 306, in the axial middle of the body 306, through an outer side 310 thereof, opposite to the flange 304. The center-fill port 300 may extend entirely through the body 306 in an axial direction. The body 306 may be curved inwards at the center-fill port 300, as shown, forming a rim 312. The plug 100 and/or the plug 309 may be removed to allow for lubricant addition and/or drainage.

In the illustrated embodiment, the plug 100 is pressed axially into the center-fill port 300, so as to provide a vented obstruction thereof. In particular, as the plug 100 is pressed into the opening, the axial end 116 of the base 102 deflects resiliently inward, until the rim 312 is received into the retention contour 202, between the retaining lip 200 and the transition surface 105.

Figure 2:
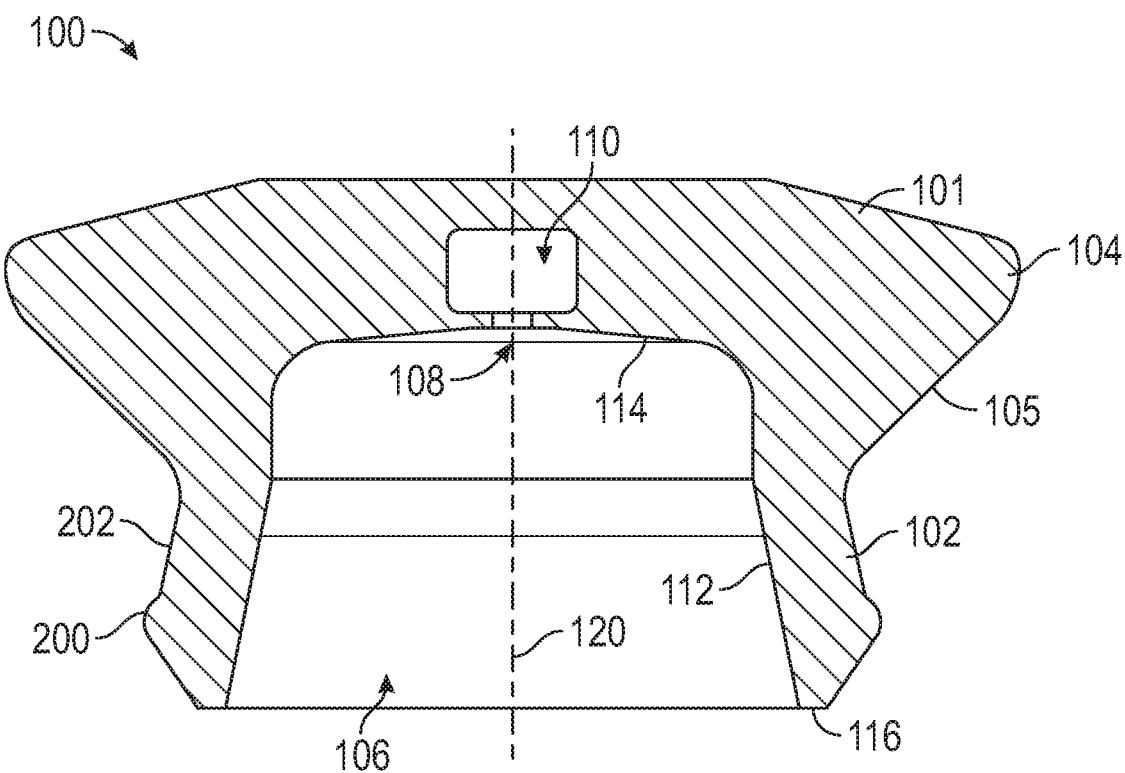

The radial opening 110 (see FIGS. 1 and 2) is positioned on the cap 104, such that the radial opening 110 remains outside of the hubcap 302 body 306, and thereby provides a flowpath between the interior of the hubcap 302 and the exterior thereof.

As also shown in FIGS. 3 and 4, the plug 100 may include an inner splash shield 400. The inner splash shield 400 may be received into the cavity 106 and retained in place, e.g., via a resistance fit. The inner splash shield 400 may be configured to allow for gases (e.g., air) to communicate between the interior of the hubcap 302 and the exterior via the plug 100, while preventing liquids (e.g., oil) from escaping from within the hubcap 302 via ventilation flowpath. In an example, the inner splash shield 400 may include a generally cylindrical section 402 and an open-ended toroidal retaining section 404. The open-ended toroidal retaining section 404 may be positioned around the cylindrical section 402, and may bear against the inner surface 112 (see FIG. 2) of the base 102 defining the cavity 106. The retaining section 404 may be resilient, and may be sized such that pressing the inner splash shield 400 into the cavity 106 causes the retaining section 404 and/or the (e.g., elastomeric) cap 104 to resiliently deflect outwards and thus the retaining section 404 and the cap 104/base 102 may hold together via interference.

In addition, the inner splash shield 400 may include one or more openings 406 (two are visible). The opening 406 may not be aligned with the axial passage 108. Rather, for example, the opening 406 may be radially extending, and, e.g., defined through a side of the cylindrical section 402. As such, gaseous communication through the opening 406, the passage 108, and the radial opening 110 may be permitted, while liquids may be generally blocked by the inner splash shield 400 from exiting outwards through the ventilation flowpath (e.g., the passage 108 and radial opening 110).

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such a feature may be combined with one or more other features of the other implementations as may be desired and advantageous for any given or particular function.

Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A plug for a hubcap, comprising:
a base configured to fit into and obstruct a port of the hubcap, wherein the base at least partially defines a cavity therein; and
a cap extending radially outward from and integrally formed with the base, wherein the cap defines an opening therein, the opening extending at least partially radially and outwardly through a side of the cap, the side having an outer radial dimension that is greater than any outer radial dimension of the base, and a passage extending axially between the opening and the cavity, wherein the opening is in fluid communication with the cavity via the passage.

2. The plug of claim 1, wherein the base expands radially outwards as proceeding away from the cap.

3. The plug of claim 2, wherein the base defines an axial end that is opposite to the cap, the cavity being open ended at the axial end, and wherein the base comprises a retention lip extending radially outwards from a remainder of the base proximal to the axial end.

4. The plug of claim 3, wherein the base defines a retention contour between the retention lip and the cap, wherein the axial end of the base is configured to deform radially inwards as the base is received into the port of the hubcap, and wherein the hubcap is received in the retention contour to hold the plug in place.

5. The plug of claim 1, further comprising an inner splash shield positioned in the cavity, wherein the inner splash shield comprises an opening that communicates with, but is not aligned with, the passage.

6. The plug of claim 5, wherein the inner splash shield comprises a bottom, a cylindrical side surface, and an open-ended toroidal retention portion, and wherein the open-ended toroidal retention portion bears against a surface of the base defining the cavity, so as to retain the inner splash shield in the cavity.

7. The plug of claim 6, wherein the opening of the inner splash shield extends radially through the cylindrical side surface, and wherein the passage is aligned with the bottom of the inner splash shield.

8. The plug of claim 7, wherein the passage extends axially between the cavity and the opening of the cap.

9. A hubcap, comprising:
a hubcap body defining a port; and
a plug configured to be received into the port, so as to at least partially obstruct the port, wherein the plug comprises:
a base configured to fit into and couple with the port, wherein the base at least partially defines a cavity therein; and
a cap extending radially outward from and integrally formed with the base, wherein the cap defines an opening therein, the opening extending at least partially radially and outwardly through a side of the cap, the side having an outer radial dimension that is greater than any outer radial dimension of the base, and a passage extending axially between the opening and the cavity, wherein the opening is in fluid communication with the cavity via the passage.

10. The hubcap of claim 9, wherein the plug does not include any filters or valves.

11. The hubcap of claim 9, wherein the plug further comprises an inner splash shield positioned in the cavity, and wherein the inner splash shield defines an opening that is in communication with, and not axially aligned with, the passage.

12. The hubcap of claim 11, wherein the inner splash shield comprises a bottom, a cylindrical side surface, and an open-ended toroidal retention portion, and wherein the open-ended toroidal retention portion bears against a surface of the base defining the cavity, so as to retain the inner splash shield in the cavity.

13. The hubcap of claim 12, wherein the opening of the inner splash shield extends radially through the cylindrical side surface, and wherein the passage is aligned with the bottom of the inner splash shield.

14. The hubcap of claim 9, wherein the hubcap body comprises a flange configured to be coupled to a wheel.

15. The hubcap of claim 9, wherein the hubcap body defines an inner chamber configured to hold a lubricant.

16. The hubcap of claim 9, wherein the port in the hubcap body is a center-fill port defined proximal to an axial middle of the hubcap body.

17. The hubcap of claim 16, wherein the hubcap body comprises a rim defining the port in the hubcap body, wherein the plug comprises a retention lip and a retention contour, wherein the retention lip is received through the port in the hubcap body, and wherein the retention contour engages the rim to maintain a position of the plug in the port in the hubcap body.

18. An apparatus for plugging a centerfill port in a hubcap, comprising:
a base configured to fit into and obstruct the port of the hubcap, wherein the base at least partially defines a cavity therein;
a cap that is integral with the base and extends radially outward therefrom, wherein the cap defines an opening therein, the opening extending at least partially radially, and a passage extending axially between the opening and the cavity, wherein the opening is in fluid communication with the cavity via the passage;
an inner splash shield positioned in the cavity, wherein the inner splash shield comprises an opening that communicates with, but is not aligned with, the passage, wherein the inner splash shield comprises a bottom, a cylindrical side surface, and an open-ended toroidal retention portion, wherein the open-ended toroidal retention portion bears against a surface of the base defining the cavity, so as to retain the inner splash shield in the cavity, wherein the opening of the inner splash shield extends radially through the cylindrical side surface, and wherein the passage is aligned with the bottom of the inner splash shield, and
wherein the apparatus does not include any filters or valves.

* * * * *